(12) United States Patent
Boatright (10) Patent No.: US 6,426,112 B1
(45) Date of Patent: Jul. 30, 2002

(54) SOY PRODUCTS HAVING IMPROVED ODOR AND FLAVOR AND METHODS RELATED THERETO

(75) Inventor: William L. Boatright, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 09/621,368

(22) Filed: Jul. 21, 2000

Related U.S. Application Data
(60) Provisional application No. 60/145,288, filed on Jul. 23, 1999.

(51) Int. Cl.[7] .............................. A23L 1/015; A23L 1/20; A23L 1/211
(52) U.S. Cl. ...................... 426/634; 426/615; 426/656
(58) Field of Search ............................... 426/634, 615, 426/656

(56) References Cited

U.S. PATENT DOCUMENTS

| | | | | |
|---|---|---|---|---|
| 3,361,575 A | * | 1/1968 | Paulsen | 426/634 |
| 3,630,753 A | * | 12/1971 | Meinychyn | 426/634 |
| 3,660,111 A | * | 5/1972 | Koch | 426/634 |
| 3,937,843 A | | 2/1976 | Osaka et al. | |
| 5,244,790 A | | 9/1993 | Kim | |
| 5,374,751 A | | 12/1994 | Cheng et al. | |

OTHER PUBLICATIONS

Qviat et al.—Unconventional Proteins as Aroma Precursors, Chemical Analysis of Volatile Compounds in Heated Soy, Casein, and Fish Protein Model Systems—*J. Agr. Food Chem.*, vol. 22, No. 6, 1974, pp. 1078–1084.

\* cited by examiner

*Primary Examiner*—Helen Pratt
(74) *Attorney, Agent, or Firm*—McDermott, Will & Emery (57) ABSTRACT

The present invention provides improved soy protein products, soy plants and seeds, and methods to produce the soy protein products.

23 Claims, 3 Drawing Sheets

SOY PRODUCTS HAVING IMPROVED ODOR AND FLAVOR AND METHODS RELATED THERETO

CROSS-REFERENCE TO A RELATED APPLICATION

This application claims the benefit of priority of Provisional Application No. 60/145,288, filed Jul. 23, 1999, which is incorporated herein by reference.

BACKGROUND OF THE INVENTION

While soybeans provide a high-quality protein, and there are increasing reports of health benefits from consuming soy protein products (FDA, 1999), the demand for soybeans in human foods has not been large. In 1971, less than 1 percent of the U.S. soybean crop was used as a protein source for human foods (Wolf and Cowen, 1971) and today, this value is about the same (SoySource, 1999). This is largely due to the undesirable flavor and odor associated with soy products (Kinsella, 1979; McLeod and Ames, 1988; Wilson et al, 1990; Freese, 1999). Jorge et al. (1999) demonstrated that the introduction of as little as 2% powdered soy milk into chocolate significantly lowered sensory scores with levels above 6% were deemed unacceptable. Incorporating soy protein isolate (SPI) at a level of 2% into frankfurters significantly lowered sensory scores (He and Segranek, 1996). The components that comprise the beany odor of soy products have been thought to include aliphatic carbonyls, volatile fatty acids, amines, alcohols or furans which were derived, in part, from the action of soybean lipoxygenase and subsequent formation of lipid oxidation products (Wolf and Cowan, 1975; Sessa and Rackis, 1977). Much work as been accomplished in recent decades toward developing soybean mutants that lack the lipoxygenase (EC 1.13.11.12) isozymes (L-1, L-2 and L-3) (Kitamura, 1984, Pfeiffer et al, 1992). These mutants allowed Shen et al, (1996) and Shen et al, (1997) to demonstrate that soybean oils prepared from lipoxygenase null soybeans showed no significant improvement in oil stability. Also, soy protein products prepared from lipoxygenase null soybeans still contained significant levels of "beany" odor (Maheshwari et al, 1997).

Headspace analyzes of unheated and heated SPI employing gas chromatography/mass spectrometry (GC/MS) have been used for examining the volatile components associated with soy proteins (Qvist et al, 1974; del Rosario et al, 1984). However, the contribution of these individual components to the odor of these soy products was not investigated. A similar method was used to examine the volatile compounds associated with hydrolyzed soy proteins (Manley and Fagerson, 1970). Takahashi et al (1979) and Maheshwari et al (1997) demonstrated that treating aqueous extracts of soy flour with aldehyde oxidase produced a reduction in the beany odor of these extracts and selected aldehydes were reduced. The contribution of individual aldehydes to the overall beany odor was not demonstrated by either investigation. Kobayashi et al (1995) analyzed solvent extracts of uncooked-soaked and ground soybeans by gas chromatography/olfactometry (GCO), GC/mass spectrometry (MS) and aroma extract dilution analysis. They concluded that the main contributors to the odor of uncooked-soaked and ground soybeans (in order with the strongest first) were trans,trans-2,4-nonadienal, trans,trans-2,4-decadienal, hexanal, 2-pentyl furan, 1-octen-3-one, trans-2-nonenal, an unidentified compound and trans,cis-2,4-nonadienal. Because soymilk is typically heated to deactivate the lipoxygenase, other degradative enzymes and trypsin inhibitors, these findings have limited application to soymilk. Torres-Penarada and others (1998) demonstrated a reduction of cooked beany odor and flavor in soymilk made from lipoxygenase-free soybeans.

Boatright and Crum (1997) analyzed the lipid extracts from "dry" commercial SPIs by GCO and GC/MS. The strongest identified odor compounds (in order of strongest first) were butyric acid, 2-methyl butyric acid methyl ester, 2-pentyl pyridine and hexanal. The mean content of 2-pentyl pyridine in commercial soy protein isolates is 54,000 times above its flavor threshold (0.000012 ppm) and contributes an extremely repulsive flavor profile (described as having a throat-catching taste and a grassy odor by our sensory panelists). This is the highest reported flavor value of any compound found in soy protein products and the first reported occurrence of 2-pentyl pyridine in a soy product.

Other compounds that have been thought to contribute to the taste of soy products include a report that phenolic acids might contribute to the bitter/astringent characteristic of soy (Arai et al, 1966). Subsequent investigations by Rackis et al (1967) and Maga and Lorenz (1974) indicated that the level of combined phenolic acids in soybean flour is close to their synergistic flavor threshold level of 40 to 90 parts per million (ppm). Subsequent processing modifications that substantially reduced the level of phenolic acids in SPI resulted in no significant improvement in the bitter/astringent flavor properties of SPI (How and Morr, 1982).

An investigation of the undesirable flavor components extracted from whole soybean meal with 70% ethanol (Okubo et al, 1992) concluded that the soy saponins and isoflavones contributed to the bitterness and astringency of whole soybeans, of which soy saponin A made the strongest contribution. This investigation reported flavor thresholds and profiles (in water) for many soy saponins and isoflavones. The level of total saponins in soy protein isolates was previously determined to be 0.76% (Ireland et al, 1986) with approximately one-sixth of these being soy saponin A (Ireland and Dziedzic, 1986). Since the level of soysaponin A in SPI is approximately 1000 times above its reported flavor threshold, it likely contributes to the bitter/astringent characteristic of SPI.

Oxidized phosphatidylcholine (PC) in aqueous suspensions was reported to develop a bitter taste (Sessa et al, 1974) with a flavor threshold value of 0.006% (Sessa et al, 1976). Since defatted soy flakes contain approximately 0.08% (a flavor value of 13), oxidized PC was proposed to contribute to the bitterness in soy protein products. These conclusions are in disagreement with the findings of Honig et al (1969) which reported no such flavors associated with the phospholipids from defatted soy flakes.

Methanethiol has been shown to be a primary contributor to halitosis (bad breath) in humans (Yasuda et al, 1996). Dimethyl trisulfide, methanethiol and β-ionone have been reported to be major contributors to the offensive odors formed when broccoli florets were stored under reduced-oxygen conditions (Hansen et al, 1992). Chin and Lindsay (1994a) demonstrated that DMTS could be formed from methanethiol in the presence of transition metals and ascorbate. Another proposed mechanism for DMTS formation in Brassica vegetables (including broccoli) involves the conversion of S-methylcysteine sufoxide to sulfenic acid (by the action of cystine lyase) with subsequent dimerization to methyl methanethiosufinate (Marks et al, 1992). The sulfinate could then react rapidly with hydrogen sulfide to form DMTS. The reaction of methyl methanethiosulfinate and methyl methanethiosulfonate with hydrogen sulfide to form DMTS in model systems has been confirmed by Chin and Lindsay (1994b) and was proposed to be the prominent mechanism for the formation of methanethiol and DMTS in Brassica vegetables.

Citation of the above documents is not intended as an admission that any of the foregoing is pertinent prior art. All statements as to the date or representation as to the contents of these documents is based on subjective characterization of information available to the applicant, and does not constitute any admission as to the accuracy of the dates or contents of these documents.

References

Aaslyng, M. D., J. S. Elmore and D. S. Mottram, 1998. Comparison of the aroma characteristics of acid-hydrolyzed and enzyme-hydrolyzed vegetable protein produced from soy, *J. Agric. Food Chem.*, 46:5225–5231.

Arai, S., H. Suzuki, M. Fujimaki, and Y. Sakarai, 1966. Studies on flavor components in soybeans. Part 2: Phenolic acids in defatted soybean flour, *Agr. Biol. Chem.*, 30:364.

Bligh, E. G. and Dyer, W. J., 1959. A rapid method of total lipid extraction and purification, *Can. Biochem, Phys.*, 37;911–917.

Boatright, W. L., and A. D. Cram, 1997. Odor and flavor contribution of 2-pentyl pyridine to soy protein isolates, *J. Am. Oil Chem. Soc.*, 74:1575–1581.

Boatright, W. L. and Q. Lei, 1999a. Compounds contributing to the "beany" odor of aqueous solutions of soy protein isolates, *J. Food Science.*, 64:667–670.

Boatright, W. L. and Q. Lei, 1999b. Compounds responsible for the "beany" odor of aqueous solutions of soy protein isolates, Institute of Food Technologists Annual Meeting Technical Program Book of Abstracts, #17-3, Chicago, Ill.

Boatright, W. L. and Q. Lei.2000. Headspace evaluation of methanethiol and dimethyl trisulfide in aqueous solutions of soy protein isolates, *J. Food Science.*, In Press.

Chin, H-W. and R. C. Lindsay, 1994a. Ascorbate and transition-metal mediation of methanethiol oxidation to dimethyl disulfide and dimethyl trisulfide. *Food Chem.*, 49:387–392.

Chin, H-W. and R. C. Lindsay, 1994b. Mechanisms of formation of volatile sulfur compounds following the action of cysteine sulfoxide lyases, *J. Agric. Food Chem.* 42:1529–1536.

Food and Drug Administration, 1999. Food Labeling: Health Claims; Soy Protein and Coronary Heart Disease. Federal Register, Oct. 26, 1999 64 (206) 57699–57733.

Freese, B., 1999. Soy is healthy, but will we eat it?, Successful Farming, Vol. 97, No. 7.

Hagerman, A. E. 1992. Tannin-Protein Interactions, C. T. Ho, C. Y. Lee, and M. T. Huang eds., American Chemical Society, Washington, D.C. pp. 236–247.

Hansen, M., R. G. Buttery, D. J. Stern, M. I. Cantwell and L. C. Ling, 1992. Broccoli storage under low-oxygen atmosphere: Identification of higher boiling point volatiles, *J. Agric. Food Chem.* 40:850–852.

Haslan, E., T. H. Lilley, E. Warminski, H. Liao, Y. Cai, R. Martin, S. H. Gaffney, P. N. Goulding and G. Luck, 1992. Polyphenols complexation: A study in molecular recognition, in Phenolics Compounds in Foods and their Effects on Health I. Analysis, Occurrence & Chemistry, C. T. Ho, C. Y. Lee, and M. T. Huang eds., American Chemical Society, Washington, D.C. pp. 8–50.

He, Y. and J. G. Segranek, 1996. Frankfurters with lean finely textured tissue as affected by ingredients, *J. Food Sci.*, 61:1275–1280.

Hoing, D. H., D. J. Sessa, R. L. Hoffmann and J. J. Raskis, 1969. Lipids of defatted soybean flakes: Extraction and characterization, *Food Tech.*, 23:95–100.

How, J. S. L. and C. V. Morr, 1982. Removal of phenolic compounds from soy protein extracts using activated carbon, *J. Food Sci.*, 47:933.

Jorge, M. C., L. Rodriguez, J. L. Rodriguez and C. Beltrán, 1999. Replacement of whole-milk powder with soy milk in chocolate. *Alimentaria*, 36:49–53.

Ireland, P. A. and S. Z. Dziedzic, 1986. High-performance liquid chromatography of soya saponins on silica phase with evaporative light-scattering detection, *J. Chrom.*, 361:410.

Ireland, P. A., S. Z. Dziedzic, and M. W. Kearsley, 1986. Saponin content of soya and some commercial soya products by means of high-performance liquid chromatography of the sapongenins, *J. Sci. Food Agric.*, 37:694.

Kinsella, J. E., 1979. Functional properties of soy proteins, *J. Food Sci.*, 56:242–257.

Kitamura, K. 1984. Biochemical characterization of lipoxygenase lacking mutants, L-1-less, L-2-less, and L-3-less soybeans, *Agric. Biol. Chem.* 48:2339–2346.

Kobayashi, A., Y. Tsuda, N. Hirata, K. Kubota and K. Kitamura. 1995. Aroma constituents of soybean [Glycine max (L.) Merril] milk lacking lipoxygenase isozymes. *J. Agric. Food Chem.*, 43: 2448–2452.

Maheshwari, P., P. A. Murphy and Z. L. Nikolov, 1997. Characterization and application of porcine liver aldehyde oxidase in the off-flavor reduction of soy proteins, *J. Agric. Food Chem.*, 45: 2488–2494.

Maga, J. A., and L. Lorenz, 1974. Gas-liquid chromatography separation of free phenolic acids fractions in various oilseed protein sources, *J. Food Sci.*, 25:797.

Manley, C. H. and I. S. Fagerson, 1970. Major volatile neutral and acid compounds of hydrolyzed soy protein, *J. Food Sci.*, 35:286.

Marks, H. S., J. A. Hilson, H. C. Leichtweis and G. S. Stoewsand, 1992. S-Methylcysteine sulfoxide in Brassica vegetables and formation of methyl methanethiosulfinate from brussels sprouts, *J. Agric. Food Chem.*, 40:2098–2101.

Meilgaard, M. G. V. Civille and B. T. Carr, 1991. *Sensory Evaluation Techniques*, $2^{nd}$ ed., CRC Press, Ann Arbor, Mich., pp. 99–122 & 228–240.

McLeod, G. and J. Ames. 1988. Soy flavor and its improvement, *Crit. Rev. Food Sci. Nutr.* 27: 219–402.

Milligan, B. B. Saville and J. M. Swan, 1963. Trisulphides and tetrasulphides from bunte salts, *J. Chem. Soc.* 3608–3614.

Negishi, O., T. Ozawa, 1998. Deodorant Composition," U.S. Pat. No. 5,804,170.

Okubo, K., M. Iijima, Y. Kobayashi, T. Uchida and S. Kudou, 1992. Components responsible for the undesirable taste of soybean seeds, *Biosci. Biotech. Biochem.*, 56:99.

Pfeiffer, T. W., D. F. Hildebrand and M. D. TeKrony, 1992. Agronomic performance of soybean lipoxygenase isolines, *Crop Sci.*, 32:357–362.

Qvist, I. H., and Erik C. F. von Sydow, 1974. Unconventional proteins as aroma precursors. Chemical analysis of the volatile compounds in heated soy, casein, and fish protein model system, *J. Agric. Food Chem.*, 22:1077.

Rackis, J. J., D. J. Sessa and D. H. Hoing, 1967. Isolation and characterization of flavor and flatulence factors in soybean meal, in *Soy Protein Foods*, U.S. Dept. Of Agriculture, ARS del Rosario, R., B. O. de Lumen, T. H. Habu, R. A. Flath, R. Mon, and R. Teranishi, 1984. Comparison of headspace volatiles from winged beans and soybeans, *J. Agric. Food Chem.*, 32:1011.

Shen, N., W. Fehr, L. Johnson, and P. White, 1996. Oxidative stabilities of soybean oils that lack lipoxygenase, *J. Am. Oil Chem Soc.*, 73:1327–1336.

Shen, N., W. Fehr, and P. White, 1997. High-temperature stabilities of oils from soybeans that lack lipoxgygenase, *J. Am. Oil Chem Soc.*, 74:381–385.

Sessa, D. J., K. Warner, and J. J. Rackis, 1974. Soybean phosphatidyl choline develops bitter taste on autoxidation, *J. Food Sci.*, 39:69 .

Sessa, D. J., K. Warnar, and J. J. Rackis, 1976. Oxidized phosphatidylcholine from defatted soybean flakes taste bitter, *J. Agric. Food Chem.* 24:16.

Sessa, D. J. and J. J. Rackis, 1977. Lipid-derived flavors of legume protein products, *J. Am. Oil Chem. Soc.*, 54:468.

SoySource, September, 16, 1999. Soybeans checkoff research shows growing appetites for soy foods. http://www.unitedsoybean.org, The United Soybean Board.

Suylen, G. M. H., P. J. Large, J. P., Van Dijken, and J. G. Kuenen, 1987. *Journal of General Microbiology*, 133: 2989–2997.

Takahashi, N., R. Sasaki and H. Chiba, 1979. Enzymatic improvement of food flavors IV. Oxidation of aldehydes in soybean extracts by aldehyde oxidase, *Agric. Biol. Chem.*, 43:2557–2561.

Torress-Penaranda, A. V., C. Reitmeier, L. A. Wilson, W. R. Fehr and J. M. Narvel, Sensory Characteristics of soymilk and tofu make from lipoxygenase-free and normal soybeans, *Journal of Food Science*, 63:1084–1087.

Visscher, P. T. and B. F. Taylor, 1993. A new mechanism for the aerobic catabolism of dimethyl sulfide. *Applied and Environmental Microbiology*, 59:3784–9.

Whitfield, F. B. and J. H. Last, 1991. Vegetables in *Volatile Compounds in Foods and Beverages*, ed. by H. Maarse, Marcel Dekker, Inc., New York, N.Y., pp. 214 and 237.

Wilson, L. A., L. A. Johnson, M. L. Hayenga, and M. H. Love, 1990. "Protein used for food and industrial products" in *Economic Implications of Modified Soybean Traits*, ed. C. A. Greiner, Iowa Agricultural and Home Economics Experiment Station, Ames, Iowa. pp Wolf, W. J. and J. C. Cowan, 1975. *Soybeans as a Food Source*, CRC Press, Inc., Boca Raton, Fla.

Yasuda, H. and Miki Ut, 1992. Deodorant effect of plant extracts of the family Rosaceae against methyl mercaptan, *Nippon Nōgeikagaku Kaishi*, 66:1475–1479.

Yasuda, H. and A Onogi, 1996. Effects of ascorbic acid on the deoderizing activity of polyphenols against methanethiol, *Biosci. Biotech. Biochem.*, 60:1703–1704.

Yasuada, H. and T. Arakawa, 1995. Deodorizing mechanism of (−)-epigallocatechin gallate against methyl mercaptan. *Biosci. Biotech. Biochem.*, 59:1232–1236.

SUMMARY OF THE INVENTION

It is therefore an object of the present invention to provide soy products, especially food items with less offensive odor and flavor.

It is a further object to provide methods to produce soy products, especially food items that comprise soy products, wherein the soy products result in less offensive odor and flavor.

Definitions

"Soybean(s)" or "soy" or "soy product(s)" means any soybean based product, including, but not limited to, whole soybeans, soybean pieces, soy meal, soybean flour, soybean milk, soy protein concentrate, soy protein isolate, etc.

The "phenolic compounds", include compounds having one or more of phenolic hydroxyl groups and which reduce offensive soy odor. The term "phenolic hydroxyl group" used herein stands for a hydroxyl group directly bonded to an aromatic ring like the benzene ring. The aromatic ring may be any of benzene, pyridine, thiophene, naphthalene, biphenyl, benzoic acid, catechins and other aromatic rings which have a structure that can be converted into ketones by oxidation of hydroxyl groups. Benzene ring is most preferred.

Moreover, for the purposes of the present invention, the term "a" or "an" entity refers to one or more of that entity; for example, "a deodorant compound" or "an extract" refers to one or more of those compounds or at least one compound. As such, the terms "a" (or 'an"), "one or more" and "at least one" can be used interchangeably herein. It is also to be noted that the terms "comprising", including", and "having" can be used interchangeably. Furthermore, a compound "selected from the group consisting of" refers to one or more of the compounds in the list that follows, including mixtures (i.e. combinations) of two or more of the compounds. According to the present invention, an isolated or biologically pure, molecule is a compound that has been removed from its natural milieu. As such, "isolated" and 'biologically pure' do not necessarily reflect the extent to which the compound has been purified. An isolated compound of the present invention can be obtained from its natural source and partially purified such that other components remain present in the mixture, or can be produced using molecular biology techniques or can be produced by chemical synthesis.

DETAILED DESCRIPTION OF THE INVENTION

The present invention provides soy protein products comprising less than 100% naturally-occurring methanethiol and/or dimethyl trisulfide. In particular, those products wherein said naturally occurring methanethiol and/or dimethyl trisulfide is present at a 1 to 95% reduction over naturally-occurring levels and reduces the offensive odor of the soy protein product are provided. Specifically, those soy protein products preferred are those comprising naturally-occurring methanethiol and/or dimethyl trisulfide at a percentage less than that of the a percentage selected from the group consisting of 100%, 95%, 90%, 85%, 80%, 75%, 70%, 65%, 60%, 55%, 50%, 45%, 40%, 35%, 30%, 25%, 20%, 15%, 10%, 5%, and 1%.

Measurement of the percent reduction can be accomplished as described in the examples, or by simply sniffing the product before and after reduction of the methanethiol and/or dimethyltrisulfide. Alternatively, quantification of methanethiol and DMTS can be done, so as to remove the necessity of the subjective test.

The odor threshold for methanethiol is about 200 parts per trillion (ppt) or 200 ng per liter. Therefore, in light of the present invention, reduction below these levels in soy protein would improve soy protein product odor and flavor. Levels less than 10 ppt are optimum, although levels less than 0.1 parts per million would also improve flavor and odor. More preferred are soy protein products with levels of approximately less than 0.1 ppm, 0.01 ppm, 0.001 ppm, 0.0001 ppm, and 0.00001 ppm.

The odor threshold for DMTS is 5–10 ppt. Therefore, in light of the present invention, reduction below these levels in soy protein would improve soy protein product odor and flavor. Optimum levels are those less than 5 ppt, although levels less than 0.05 parts per million would also improve flavor and odor. More preferred are soy protein products with levels of approximately less than: 0.005 ppm, 0.0005 ppm, 0.00005, and 0.000005 ppm.

The soy protein products of the present invention can comprise a soy component selected from the group consisting of: soy flour, soy bean, soy meal, soy paste, soy milk, soy protein concentrates and soy protein isolates. Starting materials for making the present soy protein products can be obtained commercially from Archer Daniels Midland, (Decatur, Ill.,) or from other commercial sources.

Also provided are food items comprising a soy protein product of the present invention, especially one selected from the group consisting of: a drink (ie. milks and teas), a fast food item (ie. hamburgers, hot dogs and other sausages, cereal bars, etc.), a vegetarian item, a meat item (ie. imitation seafood or other structured meat products), an oil and dairy products (ie. imitation cheese, butter or yogurt). The list above is not intended to be limiting; in fact, the present invention will allow new products to be fabricated since odor was a barrier to using soy protein products in food items previous to this invention. Soy protein can now be used instead of any protein in recipes in which protein is incorporated. Starting materials for making these products are widely available commercially.

Soy protein products provided include those which have substantially reduced levels of offensive odors to humans, wherein said odor offensiveness is determined subjectively by 10 people 9 out of 10 of whom perceive a reduction in offensive odor.

In other words, soy protein products comprising a maximum of 10, 20, 30, 40, 50, 60 or 90 percent of naturally-occurring methanethiol and/or dimethyl trisulfide are provided.

Also, methods to reduce offensive odors in a soy protein product, comprising reducing the levels of methanethiol and/or dimethyl trisulfide in said soy protein product are provided.

Methanethiol and/or dimethyl trisulfide can be reduced according to procedures formerly used to reduce levels of these compounds. For instance, bacterial cultures, such as the thiobacilli or hyphomicrobia (which contain the methanetiol oxidase enzyme) can be used (Visscher and Taylor, 1993; Suylen et al, 1987).

Alternatively, an enzyme, such as methanethiol oxidase, (ie. purified or whole cell extract) can be used to reduce DMTS and/or methanethiol. Because methanethiol is a precursor to DMTS, it would be logical to direct enzymatic action to methanethiol, so as to reduce levels of both the methanethiol and the DMTS. As described elsewhere in this application, the soy plant can be modified so as to produce seed with lowered methanethiol and/or DMTS levels.

Methods to improve the odor of a soy protein product, comprising reducing the levels of methanethiol and/or dimethyl trisulfide in said soy protein product are also provided.

In addition, methods to identify an improved soy protein product, wherein said improvement is a reduction in offensive odors, comprising selecting a soy plant which produces seed having low production of methanethiol and/or dimethyl trisulfide. Identification can be by any means, such as by molecular biology techniques, immunological techniques or other chemical analysis.

For example, methanethiol and/or DMTS levels can be reduced over typical levels by any of the following:

a. using bacterial cultures such as the thiobacilli novellus (contains the methanthiol oxidase enzyme) or hyphomicrobia, or a purified enzyme (e.g., methanethiol oxidase) that can remove methanethiol.

b. using natural extracts e.g., raspberry leaf extracts c. using reducing substances and chelating agents (e.g., tocopherols, ascorbic acid, sodium ascorbate, sulfites, etc., and EDTA and citric acid.

d. using thiol binding agents either synthetic or natural extracts ( e.g., rosemanol from rosemary and various compounds from green tea.

e. using polyphenolic compounds such as gallates, tannic acid, catechins, etc.

Moreover, methods to produce an improved soy protein product, wherein said improvement is a reduction in offensive odors, comprising genetically modifying a soy plant to produce seed having low production of methanethiol and/or dimethyl trisulfide are provided.

Also provided are methods to produce an improved soy protein product, wherein said improvement is a reduction in offensive odors, comprising chemically treating a soy protein product so as to reduce methanethiol and/or dimethyl trisulfide concentrations in the soy protein product.

Also provided are methods to produce an improved soy protein product, wherein said improvement is a reduction in offensive odors, comprising mechanically treating a soy protein product so as to reduce methanethiol and/or dimethyl trisulfide concentrations in the soy protein product.

Also provided are soy plants cultivated or genetically modified so as to produce lowered methanethiol and/or dimethyl trisulfide concentrations are provided, as are seeds and leaves having lowered methanethiol and/or dimethyl trisulfide concentrations.

The present invention also provides soybean products comprising soybeans and deodorant selected from the group consisting of: methanethiol-deodorant and dimethyl trisulfide-deodorant.

Also provided are odor-reduced soybean products wherein said deodorant comprises a phenolic compound, or a salt of said phenolic compound.

Salts can include metal ions, such as sodium, calcium, potassium, barium, ammonium and the like, or pharmaceutically-acceptable ions such as typical inorganic acids used to form salts, including hydrochloric, hydrobromic, hydroiodic, nitric, sulfuric, phosphoric, hypophosphoric, and the like. Salts derived from organic acids, such as aliphatic mono and dicarboxylic acids, phenyl substituted alkanoic acids, hydroxyalkanoic and hydroxyalkandioic acids, aromatic acids, aliphatic and aromatic sulfonic acids, may also be used. Such pharmaceutically acceptable salts thus include acetate, phenylacetate, trifluoroacetate, acrylate, ascorbate, benzoate, chlorobenzoate, dinitrobenzoate, hydroxybenzoate, methoxybenzoate, methylbenzoate,. o-acetoxybenzoate, naphthalene-2-benzoate, bromide, isobutyrate, phenylbutyrate, beta.-hydroxybutyrate, butyne-1,4-dioate, hexyne-1,4-dioate, caprate, caprylate, chloride, cinnamate, citrate, formate, fumarate, glycollate, heptanoate, hippurate, lactate, malate, maleate, hydroxymaleate, malonate, mandelate, mesylate, nicotinate, isonicotinate, nitrate, oxalate, phthalate, teraphthalate, phosphate, monohydrogenphosphate, dihydrogenphosphate, metaphosphate, pyrophosphate, propiolate, propionate, phenylpropionate, salicylate, sebacate, succinate, suberate, sulfate, bisulfate, pyrosulfate, sulfite, bisulfite, sulfonate, benzenesulfonate, p-bromophenylsulfonate, chlorobenzenesulfonate, ethanesulfonate, 2-hydroxyethanesulfonate, methanesulfonate, naphthalene-1-sulfonate, naphthalene-2-sulfonate, p-toluenesulfonate, xylenesulfonate, tartarate, and the like. A preferred salt is the hydrochloride salt.

The pharmaceutically acceptable acid addition salts are typically formed by reacting a compound with an equimolar or excess amount of acid. The reactants are generally combined in a mutual solvent such as diethyl ether or benzene. The salt normally precipitates out of solution within about one hour to 10 days and can be isolated by filtration or the solvent can be stripped off by conventional means.

Bases commonly used for formation of salts include ammonium hydroxide and alkali and alkaline earth metal hydroxides, carbonates, as well as aliphatic and primary, secondary and tertiary amines, aliphatic diamines. Bases especially useful in the preparation of addition salts include ammonium hydroxide, potassium carbonate, methylamine, diethylamine, ethylene diamine and cyclohexylamine.

The pharmaceutically acceptable salts and solvates generally have enhanced solubility characteristics compared to the compound from which they are derived, and thus are often more amenable to formulation as liquids or emulsions.

Also provided are odor-reduced soybean products wherein said phenolic compound is an acid of a trihydroxyphenolic compound.

Also provided are odor-reduced soybean products wherein said trihydroxyphenolic compound is selected from the group consisting of the calcium salt of gallic acid, potassium salt of gallic acid, the sodium salt of gallic acid, and (−)-epigallocatechin.

Also provided are odor-reduced soybean products wherein said deodorant is selected from the group consisting of catechol, 4-methylcatechol, 5-methylcatechol, resorcinol, 2-methylresorcinol, 5-methylresorcinol, hydroquinone; biphenyldiols, 4,4'-biphenyldiol and 3,4'-biphenyldiol, catechin, (+)-catechin, (−)-epicatechin, (−)-epigallocatechin, (−)-epigallocatechin gallate, catechol derivatives, dopa, dopamine, chlorogenic acid, caffeic acid, paracoumaric acid, and tyrosine.

The present invention involves any means for reducing the levels of any of the now-identified odiferous compounds, including any means developed in the future. With regard to the odor-reducing compounds in the examples and specifically pointed out in the detailed description, the following are guidelines for amounts of odor-reducer and soy products:

100 ppm odor-reducing compound in soy milk and a 7% SPI solution works quite well. On a dry weight basis, for SPI, this is the same as 100 ppm (0.01%) divided by 0.07=1429 ppm. However, variations thereon are within the skill of the art. Indeed, 1 to 10,000 ppm of odor-reducing compound would work well in a 7% solution, and it is easily recognizable that the more soy present in a solution or other formulation, addition of more odor-reducing compound would be preferred. Therefore, the following ppm of odor-reducing compounds would be acceptable: 1 to 100, 50 to 150, 100 to 200, 150 to 250, 200 to 300, 250 to 350, 300 to 400, 350 to 450, 400 to 500, 450 to 550, 500 to 600, 550 to 650, 600 to 700, 650 to 750, 700 to 800, 750 to 850, 800 to 900, 850 to 950, 900 to 1000, 1000 to 2000, 2000 to 3000, 3000 to 4000, 4000 to 5000, 5000 to 6000, 6000 to 7000, 7000 to 8000, 8000 to 9000, 9000 to 10000. The upper and lower limits are not fixed at 1 and 10,000; they are determined by the overall constitution of the formula, and the amount of desired methanethiol- and dimethyl trisulfide-associated odors.

For the soy aspect of the formulation, the range of percent soy can be 0.0001 to 100%. The soy can therefore be any of the following percent in the formulation: 1 to 90%, 5 to 80%, 5 to 70%, 5 to 60%, 5 to 50%, 5 to 40%, 5 to 30% etc. Most formulations on the market are limited in the amount of soy included because of the foul odor. Therefore, the formulations that will be useful under the present invention are likely to contain more soy than the amounts previously used. Preferred are formulations which contain 5 to 25% soy.

Also provided are methods to make a soybean products with reduced offensive odor, comprising admixing a compound of the present invention during a soybean processing step such that the soybean product has reduced offensive odor.

EXAMPLES

The following are the sources for the materials used in the examples:

Protein Products

SPI samples were designated as Pro Fam 970 (from the Archer Daniels Midland Co., Decatur, Ill.) and Supro 500E (from Protein Technologies International, St. Louis, Mo.). Whole soybeans (Burlison variety) were obtained from the Purdue University USDA-ARS soybean breading and genetics program (West Lafayette, Ind.).

Chemicals

Butyric acid, hexanal, pentanal, 2-heptanone, methanethiol, acetaldehyde, dimethyl disulfide, dimethyl trisulfide, 2,3-butadione, 2,3-pentadione, benzaldehyde, acetophenone, trans, trans-2,4-nonadienal, and trans, trans-2,4-decadienal were obtained from Sigma Chemical Co. (St. Louis Mo.). Lancaster Synthesis Inc. (Windham N.H.) provided 2-pentyl pyridine. Bedoukian Research, Inc. (Danbury, Conn.) donated 2-pentyl furan and 1-octen-3-one was synthesized by the method of Corey and Schmidt (1979). Deuterium-labeled dimethyl trisulfide was prepared by the methods of Milligan et al (1963) using iodomethane-$d_3$ (Isotec Inc., Miamisburg, Okla.) in place of the unlabeled iodomethane.

Example 1

Compounds Responsible for the "Beany" Odor of Soy Protein Isolates (SPI) and Soy Protein Concentrates (SPC)

In order to conclusively evaluate the sensory impact of each volatile compound in 3 0 the head-space above aqueous solution of SPI and SPC, our research group used four different techniques, 1) vacuum distillation with collection of volatiles on an absorbent, 2) vacuum distillation with collection of volatiles with a solvent, 3) vacuum distillation with headspace analyses, and 4) static headspace analyses. Details of the methodology, odor descriptions and mean intensities of the volatiles concentrated by the first two methods are provided by Boatright and Lei (1999a). Major odorants were identified (Table 1) by correlating GCO and GC/mass spectrometry (MS) results on two separate stationary phases with retention times, mass spectra, odor descriptions and odor intensities of authentic Standard. All the major odor compounds were also detected at similar strengths (data not shown) from evaluations of SOYRICH® B and Procon 2000: SPCs from Central Soya (Fort Wayne, Ind.).

Figure 1:
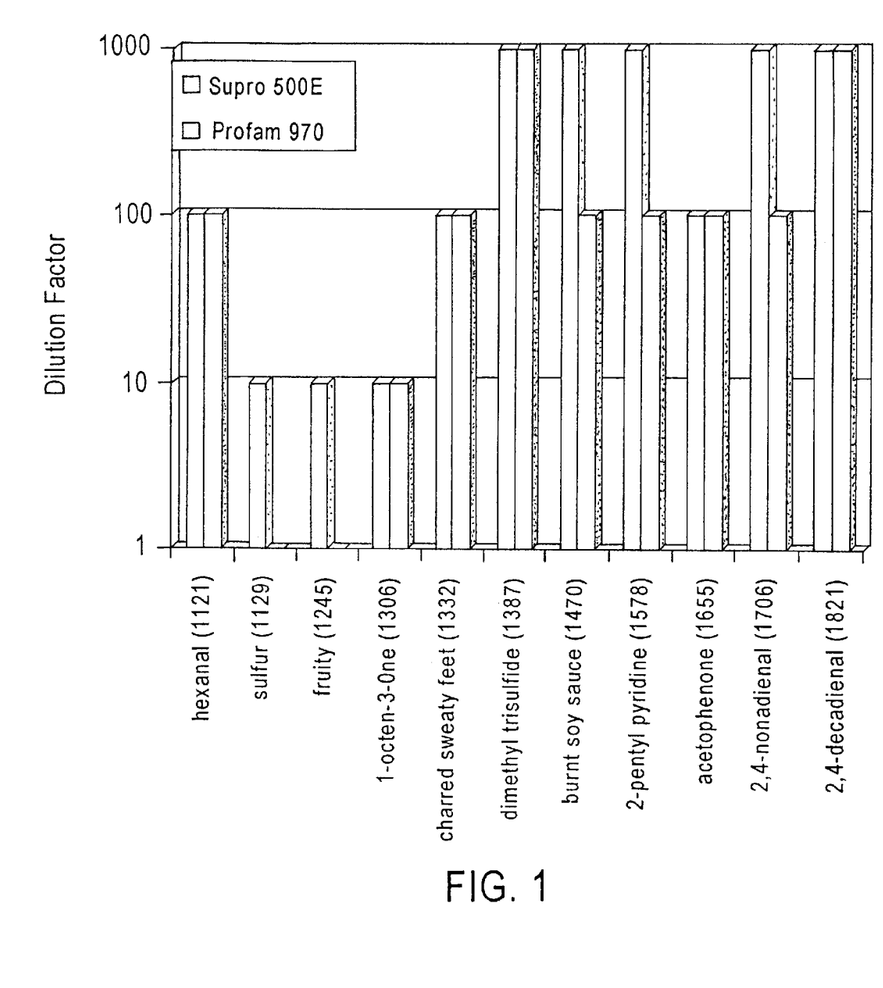
FIG. 1 Aroma Extract Dilution Analysis of the Predominate Odorants or Odors (with Kovat's Indices) from Chloroform Headspace Volatiles of Soy Protein Isolates on EC-Wax FIG. 2 Isoterchebin (1) and coriariin A (2): typical ellagitannins G=gallic acid FIG. 3 Time-Course of the Disappearance of Methanethiol from Reaction with (−)-epigallocatechin gallate (EGCg), Calcium Gallate, Potassium and Sodium Gallate, Raspberry LeafExtract used in Table 6 and the Methyl Ester of Gallic Acid (all at pH 8) as Measured by the HPLC peak area at 210 nm.

Performing aroma extract dilution analyzes (AEDA) with the chloroform-recovered headspace volatiles provided an indication of the most powerful odors and identified odorants comprising the "beany" odor of SPI (FIG. 1). From these results the strong sulfur-like odor, two oxidized fat odors and a grassy odor were the strongest contributors. Seven of the eight most powerful odorants are identified. DMTS and trans,trans-2,4-decadienal are the two most powerful odorants by this method. Other major identified odorants include 2-pentyl pyridine, trans,trans-2,4-nonadineal, hexanal, acetophenone and 1-octen-3-one. It should also be pointed out that because the chloroform-recovered headspace volatiles were used for these assays, the impact of the buttery (2,3-butanedione), oxidized/nutty (pentanal), or other odorants with a Kovat's indices below 1100 on EC-Wax and 1000 on DB-225 were not evaluated due to solvent interference and the difficulty of accurately performing AEDA with the absorbent method.

To further investigate the occurrence of these odorants, we performed subsequent GCO-MS analyses (with cryofocusing) of the concentrated volatiles by injecting various volumes of the headspace above the concentrate at 24° C. (Table 2). Compounds that were detected at the lowest headspace volumes represent the most powerful odorants. The most powerful odorant with this methods was once again DMTS, detected at 1 mL headspace from both samples. Another very powerful odorant, not detected by the two previous methods, was methanethiol, detected in 0.5 and 3 mLs from the two samples. Methanethiol was not detected with the solvent method because it is much more volatile than chloroform. It was not detected with the absorbent method probably because it is relatively polar and not absorbed onto the Tenax absorbent under the conditions of the test. This is particularly interesting because methanethiol is a likely substrate for the synthesis of DMTS. Also, several compounds detected by AEDA (2-pentyl pyridine, acetophenone, 2,4-nonadienal and 2,4-decadienal) are not represented in the direct headspace injection.

The next method employed to determine the primary odorants from aqueous solutions of SPI was to stir 7% aqueous solutions of SPI in a closed container fitted with a septum and then remove various volumes of the unconcentrated headspace for GCO-MS analysis with cryofocusing (Boatright and Lei, 1999b; Boatright and Lei, In press). Results are shown in Table 3. Because the odorants were not concentrated it required much more headspace volume to detected the odorants and only four odorants were detected at 25 mLs headspace. Again DMTS was the most powerful odorant requiring 1.25 and 5 mls to be detected in the two samples. Hexanal required 2.5 and 5 mLs, methanethiol required 10 and 20 mls, and 2-pentyl furan required 25 mLs with each sample. This step eliminates the possibility that the DMTS or methanethiol are artifacts resulting from the distillation process. Also, methanethiol (along with DMTS) was detected as a major odorant from several samples of SPC (data not shown).

Our investigation was the first to report dimethyl trisulfide (DMTS) as a component of SPI and SPC, the first to report methanethiol as a component of "unheated"-SPI and SPC, and the first to document the relative odor contribution of each of these sulfur-containing compounds. DMTS was previously identified from hydrolyzed vegetable protein (Aaslyng et al, 1998).

In order to quantify DMTS in the aqueous SPI, deuterium-labeled ($d_6$)-DMTS was synthesized (Milligan et al, 1963) and incorporated as an internal standard into the slurry just prior to distillation. The DMTS content of the ProFam 970 SPI was 60.14 ppb (s.e. 2.18) and 45.54 ppb (s.e. 3.38) in the Supro 500E. With an odor threshold value in water of 0.01 ppb (Whitfield and Last, 1991), this corresponds to odor values of 6,014 and 4,554, respectively. This is the highest reported odor value of any compound found in SPI.

To eliminate the possibility that these sulfur-containing odorants could somehow be formed in GC injector, we installed a cool, on-column injector on our Hewlett Packard GCO/MS system. Injections were made with a 12.5 cm needle directly onto the column. The injection port and oven were maintained at 35° C. during the injection with cryofocusing. Injecting the concentrated headspace volatiles directly onto the column, provided similar olfactory results as using the higher injection temperature. Injecting solvent recovered volatiles containing an internal standard of $d_6$-DMTS produced very similar ratios of m/z 132 ($d_6$-DMTS) to 126 (DMTS) using the cool, on-column method (1:1.79, respectively) compared to using the typical solvent injection port (1:1.76) with a temperature of 210° C. These additional analyses involving headspace sampling, deuterium-labeled internal standards and cool, on-column injections are a component Boatright and Lei, (In Press).

Example 2

Minimizing the Occurrence of Methanethiol and DMTS using Raspberry Leaf Extracts Yasuda and Ui (1992) reported that aqueous ethanolic extracts of raspberry (*Rubus idaeus*) leafs were effective deodorizers of methanethiol. The active components of the raspberry leaf extract or the deodorizing mechanism were not reported but believed to involve polyphenols such as ellagitannins.

The static headspace analysis of SPI using GCO/MS was repeated with a 7% SPI solution (control) and a 7% SPI solution with 2.5 mLs of the concentrated raspberry leaf extract added per 500 mLs of SPI solution. Olfactormetry results are presented in Table 4. Levels of methanethiol and DMTS were both significantly reduced. While the "beany" odor of these SPI solutions were reduced with this raspberry leaf extracts, the extracts contributed a bitter taste.

Treatment with the oxidized and "debittered" raspberry leaf extract provided a significant decrease in headspace methanethiol as measured by GCO/MS (Table 5). The SPI used in these experiments was a different code date of Supro 500E from PTI. It varied somewhat from the previous samples examined in that its aqueous solution contained less headspace DMTS and the raspberry leaf additive appeared to have no effect on the level of DMTS.

SPI samples prepared in the same manner (using the same SPI) as those represented in Table 5 were submitted to sensory analyses to evaluate the intensity of "beany" odor. A rating approach of a difference test (Meilgaard et al, 1991) was conducted with four replications to determine the degree of difference in "beany" odor among the control and treated SPI samples. Eight sensory panelists were chosen and trained on the basis of their ability to identify the "beany" odor. Coded samples were presented to panelists in random order and the panelist were asked to rate the "beany" odors. On a 10 point scale (10=strong, 0=weak) the control was rated a 5.87 and the sample treated with the raspberry leaf extract was rated a 3.23 with a standard error 0.43. The means values, standard errors and the level of significance of the responses given by the sensory panelists were determined by an analysis of variance. A mean difference of 2.64 existed between the control and treated samples (P≦0.01).

Cost of Materials for Raspberry Leaf Extract Treatment

Raspberry leafs cost $10 per pound retail (wholesale would probably be about half this). 120 grams of leafs ($2.64 at $10 per pound) produces about 440 mLs of tincture. Fifty mLs of this tincture ($0.30) is concentrated to 30 mLs and typically 1.5 mLs is used to treat 100 mLs of SPI solution or other soy protein product. Thus (1.5 30) ×$0.30= $0.015 per 100 mLs product or 15¢ per liter using a starting cost of $10 per pound of raspberry leafs. This should be an economical treatment considering that a liter of soy milk costs about $2.

Example 3

Minimizing the Occurrence of Methanethiol and DMTS using Calcium Gallate

Figure 2:
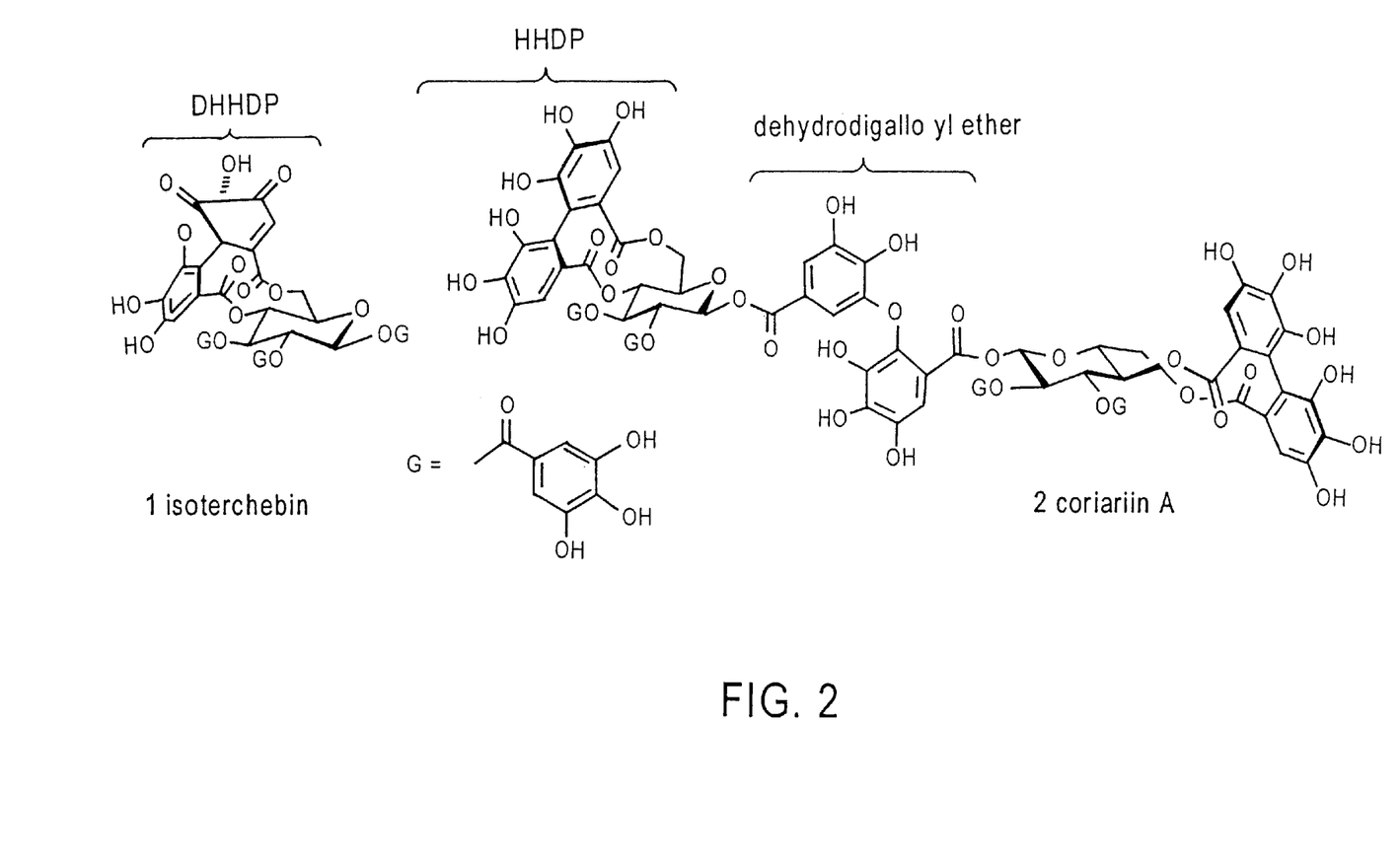
Figure 3:
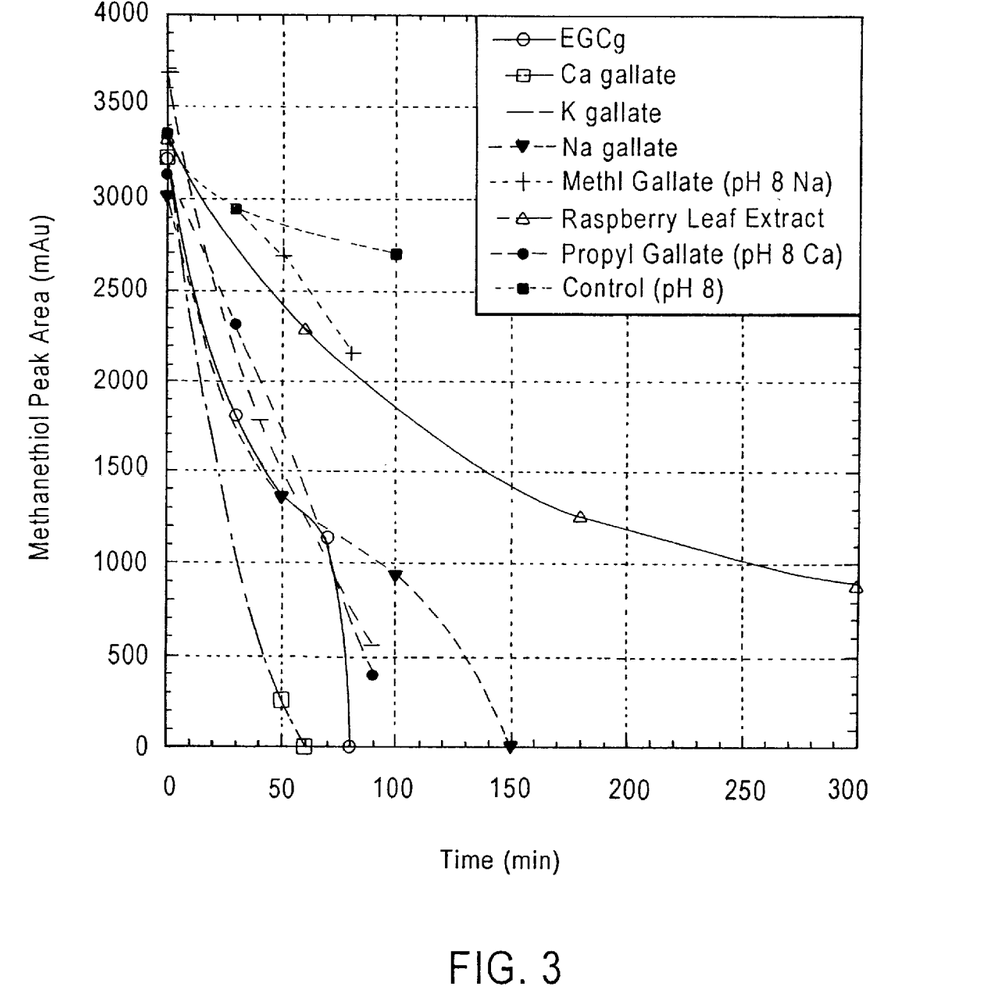

The ellagitannins typically found in raspberry leaf extracts are primarily composed of glucose esters of gallic acid (G) and gallic acid derivatives (FIG. 2). In general, these compounds are designated tri-hydroxy benzoic acids, in one example, 3,4,5, tri-hydroxybenzoic acid. An investigation of the deodorizing activity of gallic acid, salts of gallic acid and methyl gallate against methanethiol revealed that the salts of sodium, potassium and calcium were very effective. The ability of these salts of gallic acid to remove methanethiol was compared with (−)-epigallocatechin gallate, the raspberry leaf extract and the methyl ester of gallic acid by HPLC at pH 8 (FIG. 3). (−)-Epigallocatechin gallate, a constituent of green tea, is the best documented food grade material at removing methanethiol (Yasuda and Arakawa, 1995). The calcium salt of gallic acid was a moire effective remover of methanethiol than (−)-epigallocatechin. The potassium and sodium salts of gallic acid were similar to (−)-epigallocatechin. The results from the raspberry leaf extract demonstrate why if took several hours to work on soy protein. The methyl ester of gallic acid was the least effective.

Analysis of soymilk headspace volatiles by gas chromatography/olfactometry/mass spectrometry demonstrates that the addition of 100 ppm (parts per million) of calcium gallate at the beginning of the soymilk preparation process greatly reduced the level of both methanethiol and dimethyl trisulfide (Table 6). This treatment corresponded to a much improved overall odor of this soymilk as compared to the control.

Cost of Materials for Gallic Acid Treatment

Gallic acid is readily available from Sigma Chemical Company and cost ca. $90 per 500 g (≧98% pure). Purchasing in bulk would certainly be much less expensive. Gallic acid requires no further processing and does not need the addition of gums. Our treatments incorporated 0.01 grams gallic acid per 100 mLs of soy protein solution (100 ppm). At this level the cost of gallic acid would add less than $0.02 per liter of soy protein solution. [$90×(0.1 g/500 g)] Note: (−)-epigallocatechin gallate cost ca. $25 per 100 mg (80% pure)

Example 4

Method of Monitoring the Effectiveness of Various Chemicals at Deodorizing Methanethiol HPLC separations were accomplished on a Hewlett Packard (Wilmington, Del.) Series 1100 HPLC System with binary pumps, HP Chemstation controller and data evaluation, a HP 1100 diode-array detector monitoring at 210, 280 and 325 nm, and a 20 uL injection loop. Separation was accomplished on a Rainin Microsorb 5 μm C-18 column (4.6×250 mm) with a 5 μm. C-18 guard column (4.6×15 mm) (Ridgefield, N.J.). The flow rate was 1.0 mL per min. Analyses of the gallates employed a solvent gradient of 0% by volume methanol:phosphoric acid (99:1) and 100% water:phosphoric acid (99:1) at the start to 10% methanol:phosphoric acid (99;1) by 40 min. Analyses of (−) -epigallocatechin gallate employed a solvent gradient of 0% by volume methanol:phosphoric acid (99:1) and 100% water:phosphoric acid (99:1) at the start to 10% methanol:phosphoric acid (99:1) by 40 min then to 20% methanol:phosphoric acid (99:1) by 50 min. and held until 60 min. The gallates or (−)-epigallocatechin gallate were added to water at 0.1 g per 50 mLs and brought to pH 8 using the appropriate base. 250 μL of these solutions were mixed with 500 μL of nanopure water and 250 μL of ca. 900 ppm methanethiol. These solutions were stirred in an amber vial at 24° C. for the indicated time and samples were removed from the vial through a septum for HPLC analyses.

Example 5

Methods for Preparing Raspberry Leaf Extracts

For the purpose of evaluating raspberry leafs for deodorizing activity against the "beany" odor of soy protein products, cut and sifted red raspberry leafs (*Rubus idaeus*) were extracted with 44% ethanol (aqueous) at a ratio of 1 part leafs to 8 parts solvent (ie., 120 grams raspberry leafs and 960 mLs of 44% ethanol). This mixture was allowed to sit with daily stirring for 2–3 weeks. The liquid was then recovered by filtration through Whatman #4 filter paper. Typically, about 440 mLs of tincture was recovered Ten mls of the raspberry leaf tincture was concentrated to 5 mLs on a rotary evaporator to remove most of the alcohol and volatile compounds from the tincture.

To remove the majority of the bitter component, raspberry leaf tinctures (44% ethanol) were passed through a reverse phase column (octadecyl-funtionalized silica gel) (Sigma-Aldrich Chemical Co., St. Louis, Mo.). The reverse phase packing was conditioned with 44% aqueous ethanol and 50 mLs of raspberry leaf tincture was passed through 10 grams of packing (dry weight). The reverse-phase packing was regenerated by passing 10 bed volumes of 100 percent ethanol between runs. This regeneration and reuse of the reverse phase packing appears to be an indefinite process. The polyphenolic compound were then oxidized to improve their reaction capabilities with methanethiol by placing the ethanolic solution in the window for several days. At this point the extract possessed a mild "green tea" odor. To deodorize the extract, the ethanol, volatile compounds and some of the water was removed on a rotary evaporator by reducing 50 mLs of the 44% ethanol solution to about 15 mLs. The concentrate was placed in a separate container. The evaporation flask was then rinse with 15 mLs of deionized water and combined with the concentrate (total of 30 mLs). This deodorized material was frozen (−16° C.) for future use.

To date the most effective combination of treatments to improve the odor (and taste) of SPI solutions include oxidizing the raspberry leafs extracts by placing the 44% EtOH solutions (after reverse-phase purification) in the window for several days. Next, this material and 0.1% iota carrageenan were added to 45° C. water followed by cooling to 18° C. prior to adding SPI. Polysaccharides such as iota carrageenan bind to polyphenolic compounds and minimize their reaction with proteins. Other polysaccharides that may provide similar aid in this process (but not limited to) are α-, β-, γ-cyclodextrins, locust bean gum, guar gum, xanthan gum, gum arabic, pectin, dextrans as well as other forms of carrageenans such as lamda and kappa.

Example 6

Methods for Preparing Soy Milk

Burlison variety soybeans were obtained from the Purdue University USDA-ARS soybean breading and genetics program (West Lafayette, Ind.). Whole soybeans were soaked in deionized water for 10 hours, drained and rinsed several times. The hydrated soybeans were combined with deionized water (1 parts soybeans to 10 parts water). Gallic acid was dissolved in deionized water (0.2 grams per 100 mLs) and brought to pH 7.5 with the addition of 0.15 M $Ca(OH)_2$. The gallic acid pre-mix was prepared fresh every day. Additions of gallic acid solutions replaced an equal amount of the processing water to achieve an overall concentration of 100 ppm. The soybeans/water mixture was then ground in a Waring blender on medium speed for one min. The resulting slurry was immediately transferred into a glass flask which was placed in a boiling water bath. The soybean slurry was stirred and brought to 85° C. within 8 min. where it was held for 15 min. The soymilk was then cooled to 40° C. in an ice bath, filtered through cheesecloth, bottled and refrigerated (4° C.). All evaluations took place within three days.

Example 7

Methods for Quantifying DMTS and Methanethiol in Soy Products

The procedure for concentrating volatiles was repeated with the incorporation of $d_6$-dimethyl trisulfide into the SPI slurry prior to distillation. Labeled-DMTS was added at a level corresponding to 60 parts per billion (ppb) of the SPI (dry basis). The volatile compounds were extracted from the aqueous distillate (~7 mL) twice with 2 mL of Spectranalyzed® chloroform (Fisher Scientific, Pittsburg, Pa.). The combined chloroform phases were dried over anhydrous $Na_2SO_4$ and concentrated to 100 uL under a flow of dry nitrogen. Samples were stored in a freezer at −15° C.

Methanethiol in soy products can be accomplished in a similar fashion as that described for DMTS except deuterium labeled methanethiol (e.g., $d_3$-methanethiol) is used instead of $d_6$-dimethyl. Methanethiol can also be quantified by the addition of ethanethiol as an internal standard.

TABLE 1

Identified Odor Compounds from the Absorbent and Solvent Recovered Volatiles with Corresponding Kovat's Indicies on EC-Wax and DB

| Odor | | DB-225 Kovat's Indices | | EC-Wax Kovat's Indices* | |
|---|---|---|---|---|---|
| Description | Compound | found | standard | found | standard |
| Buttery | 2,3-bupadione | N/A | N/A | N/A | N/A |
| Oxidized/nutty | pentanal | N/A | N/A | N/A | N/A |
| Buttery | 2,3-pentadione | 1003 | 991 | N/A | 1102 |
| Sulfurous | dimethyl disulfide | N/A | N/A | N/A | 1127 |
| Oxidized/nutty | hexanal | 1040 | 1045 | 1121 | 1135 |
| Flowery | 2-heptanone | 1146 | 1143 | 1194 | 1206 |
| Grassy | 2-pentyl furan | 1146 | 1140 | 1238 | 1246 |

TABLE 1-continued

Identified Odor Compounds from the Absorbent and Solvent Recovered Volatiles with Corresponding Kovat's Indicies on EC-Wax and DB

| Odor | | DB-225 Kovat's Indices | | EC-Wax Kovat's Indices* | |
|---|---|---|---|---|---|
| Description | Compound | found | standard | found | standard |
| Charred-sweaty feet | ? | 1223 | ? | 1342 | ? |
| Sulfurous/green onion | dimethyl trisulfide | 1234 | 1233 | 1387 | 1390 |
| Mushroom | 1-octen-3-one | 1235 | 1233 | 1306 | 1306 |
| Almond | benzaldehyde | 1338 | 1337 | 1526 | 1529 |
| Penetrating grassy | 2-pentyl pyridine | 1463 | 1461 | 1578 | 1578 |
| Penetrating green | acetophenone | 1482 | 1487 | 1654 | 1655 |
| Oxidized/nutty | 2,4-nonadienal | 1595 | 1601 | 1703 | 1700 |
| Oxidized/nutty | 2,4-decadienal | 1697 | 1708 | 1823 | 1825 |

*Kovat's indices calculated from the chloroform extract of the distillate, N/A = not available

TABLE 2

Lowest Headspace Volume from Concentrated SPI Volatiles Required to Perceive Odorants*

| Compound or Odor Description | Volume from Supro 500 E (mLs) | Volume from Profam 970 (mLs) |
|---|---|---|
| Methanethiol | 0.5 | 3 |
| 2,3-Butadione | 5 | 5 |
| Hexanal | 3 | 3 |
| 2-Pentyl Furan | 5 | 3 |
| Charred Sweaty | 3 | 3 |
| Dimethyl Trisul | 1 | 1 |
| Burnt | 5 | 3 |

*The lower the volume the more potent the odorant

TABLE 3

Lowest Static Headspace Volume from SPI Volatiles Required to Perceive Odorants

| Compound | Volume from Supro 500 E (mLs) | Volume from Profam 970 (mLs) |
|---|---|---|
| Methanethiol | 10 | 20 |
| Hexanal | 2.5 | 5 |
| 2-Pentyl Furan | 25 | 25 |
| Dimethyl Trisulfide | 1.25 | 5 |

*The lower the volume the more potent the odorant

TABLE 4

Effect of Raspberry Leaf Extract on the Lowest Static Headspace Volume from SPI Volatiles Required to Perceive Odorant

| Compound | Volume from Control SPI Solution (mLs) | Volume from SPI Treated with Raspberry Leaf Extract (mLs) |
|---|---|---|
| Methanethiol | 15 | >25 |
| Hexanal | 5 | 5 |
| 2-Pentyl Furan | 20 | 20 |
| Dimethyl Trisulfide | 2.5 | 20 |

*The lower the volume the more potent the odorant

TABLE 5

Effect of Deodorized Raspberry Leaf Extract on the Lowest Static Headspace Volume from SPI Volatiles Required to Perceive Odorants

| Compound | Volume from Control SPI Solution (mLs) | Volume from SPI Treated with Raspberry Leaf Extract (mLs) |
| --- | --- | --- |
| Methanethiol | 5 | 20 |
| Hexanal | 10 | 10 |
| 2-Pentyl Furan | 25 | 25 |
| Dimethyl Trisulfide | 25 | 25 |

*The lower the volume the more potent the odorant

TABLE 6

Effect of Calcium Gallate on the Lowest Static Headspace Volume to Perceive Odorants from Soymilk* (The lower the volume the more potent the

| Compound | Volume from Control Soymilk (mLs) | Volume from Soymilk Treated with 100 ppm Ca Gallate* (mLs) |
| --- | --- | --- |
| Acetaldehyde | 2.5 | 5 |
| Methanethiol | 2.5 | >25 |
| Hexanal | 1.25 | 1.25 |
| 2-Pentyl Furan | 20 | >25 |
| Dimethyl Trisulfide | 5 | >25 |

*parts per million

This is the first time that GCO/MS has been used to identify the major odorants in aqueous solutions of SPI, SPC and soy milk. It is also the first time that DMTS has been reported in SPI or SPC. This is the first time methanethiol has been identified in SPC, soy milk or in a soy protein isolate that has not been exposed to temperatures over 120°. It is also the first time: the relative importance of methanethiol and DMTS to the odor of SPI, SPC and soy milk have been documented. This is also the first time that a reduction in methanethiol and/or DMTS has been shown to contribute to a soy product with improved odor/flavor.

Although the present invention has been fully described herein, it is to be noted that various changes ad modifications are apparent to those skilled in the art. Such changes and modifications are to be understood as included within the scope of the present invention as defined by the appended claims.

What is claimed is:

1. A method to produce a improved soy protein product, wherein said improvement is a reduction in offensive odors, comprising genetically modifying a soy plant to produce seed having low production of a compound selected from the group consisting of methanethiol, and dimethyl trisulfide.

2. A soybean product comprising soybeans and deodorant selected from the group consisting of: methanethiol-deodorant and dimethyl trisulfide-deodorant.

3. An odor-reduced soybean product of claim 2, wherein said deodorant comprises a phenolic compound, or a salt of said phenolic compound.

4. An odor-reduced soybean product of claim 3, wherein said phenolic compound is an acid of a trihydroxphenolic compound.

5. An odor-reduced soybean product of claim 4, wherein said trihydroxyphenolic compound is selected from the group consisting of the calcium salt of gallic acid, potassium salt of gallic acid, the sodium salt of gallic acid, and (−)-epigallocatechin.

6. An odor-reduced soybean product of claim 2, wherein said deodorant is selected from the group consisting of catechol, 4-methylcatechol, 5-methylcatechol, resorcinol, 2-methylresorcinol, 5-methylresorcinol, hydroquinone; biphenyldiols, 4,4'-biphenyldiol and 3,4'-biphenyldiol, catechin, (+)-catechin, (−)-epicatechin, (−)-epigallocatechin, (−)-epigallocatechin gallate, catechol derivatives, dopa, dopamine, chlorogenic acid, caffeic acid, paracoumaric acid, and tyrosine.

7. A method to make a soybean product with reduced offensive odor, comprising admixing a compound of claim 5 during a soybean processing step such that the soybean product has reduced offensive odor.

8. A soy protein product having reduced offensive odor, said soy protein product containing 1% to 100% less of the naturally occurring levels of methanethiol and 1% to 100% less of naturally-occurring dimethyl trisulfide.

9. The soy protein product of claim 8, wherein said soy protein product contains no methanethiol.

10. The soy protein product of claim 8, wherein said soy protein product contains no dimethyl trisulfide.

11. The soy protein product of claim 8, wherein said soy protein product contains no methanethiol and dimethyl trisulfide.

12. The soy protein product of claim 8, which comprises a soy component selected from the group consisting of soy flour, soy bean, soy meal, soy paste, soy milk, soy protein isolate, soy protein concentrate, and hydrolyzed vegetable protein.

13. A food item comprising a soy protein product of claim 8.

14. The food item of claim 13, selected from the group consisting of a drink, a fast food item, a vegetarian dish, a meat item, an imitation seafood item, a structured meat product, an oil, a dairy item and an imitation cheese.

15. A soy protein product having reduced offensive odor, said soy protein product containing 10% to 90% less of the naturally occurring levels of methanethiol and 10% to 90% less of naturally-occurring dimethyl trisulfide.

16. A method of reducing offensive odors in a soy protein product comprising treating the soy protein product with an enzyme, a natural or synthetic extract, or a polyphenolic compound.

17. The method of reducing offensive odors in a soy protein product set forth in claim 16, wherein said enzyme is methanethiol oxidase.

18. The method of reducing offensive odors in a soy protein product set forth in claim 16, wherein said natural or synthetic extract is rosemanol.

19. The method of reducing offensive odors in a soy protein product set forth in claim 16, wherein said polyphenolic compound comprises calcium gallate, sodium gallate or potassium gallate.

20. The method of reducing offensive odors in a soy protein product set forth in claim 16, wherein said polyphenolic compound is calcium gallate.

21. A soy protein product having reduced offensive odor, said soy protein product containing less than 0.1 ppm methanethiol and less than approximately 0.05 ppm naturally-occurring dimethyl trisulfide.

22. The soy protein product of claim 21, wherein said soy protein product contains less than 200 ppt methanethiol and less than 10 ppt naturally-occurring dimethyl trisulfide.

23. The soy protein product of claim 21, wherein said soy protein product contains less than 10 ppt methanethiol and less than 5 ppt naturally-occurring dimethyl trisulfide.

* * * * *